United States Patent Office 3,756,798
Patented Sept. 4, 1973

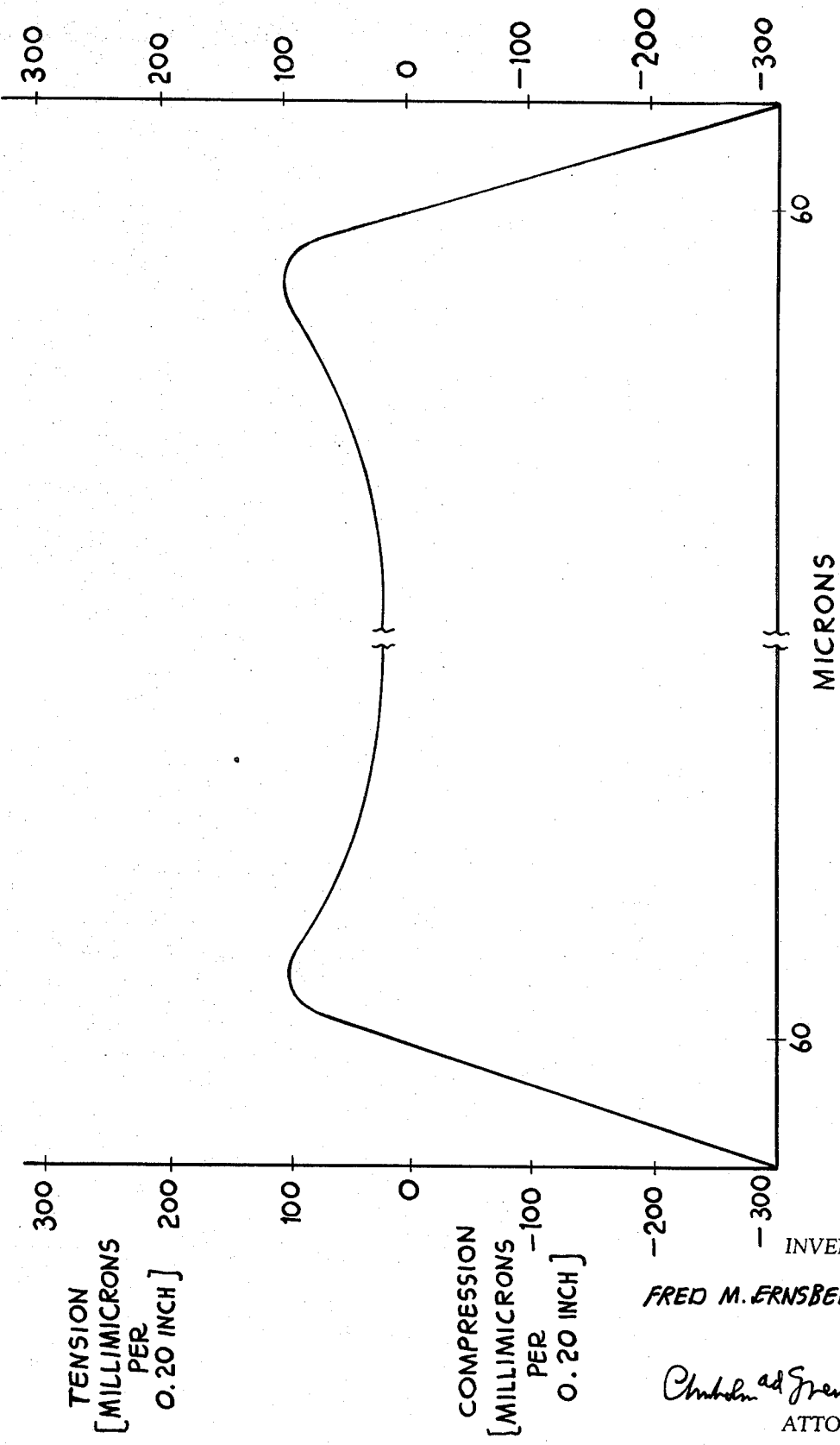

3,756,798
NOVEL GLASS-CERAMIC ARTICLE AND WATER CONTENT CRYSTALLIZATION PROCESS OF MAKING SAME
Fred M. Ernsberger, Pittsburgh, Pa., assignor to PPG Industries, Inc., Pittsburgh, Pa.
Continuation-in-part of abandoned application Ser. No. 709,667, Mar. 1, 1968. This application Mar. 16, 1971, Ser. No. 124,722
Int. Cl. C03b 29/00
U.S. Cl. 65—33          10 Claims

ABSTRACT OF THE DISCLOSURE

Novel glass-ceramic articles of superior strength and superior thermal stability are characterized as having surface zones in compression, interior zones in tension and being comprised of randomly-oriented crystals of substantially uniform composition disposed substantially uniformly throughout. Such articles are produced by controlling the relative rates of crystallization at the surface and in the interior of a glass-ceramic by controlling the relative water content at the surface and in the interior of the glass-ceramic during nucleation and crystallization.

CROSS-REFERENCE TO RELATED APPLICATIONS

This application is a continuation-in-part application Ser. No. 709,667, filed Mar. 1, 1968 now abandoned.

BACKGROUND OF THE INVENTION

This invention relates to strengthened glass-ceramic articles and to methods of their production.

Crystallized glasses, commonly referred to as glass-ceramics, have become an important article of commerce, especially for dinnerware and the like, and promise to become even more useful in the future. Glass-ceramic articles are generally of two types: semi-crystalline articles wherein only the surface areas of the article are crystalline and the interior portion is glassy; and fully-crystallized articles wherein the whole body of the article contains crystals generally randomly oriented. Articles of this latter type are described in U.S. Pat. 2,920,971 which discloses a method of nucleating and crystallizing a glass body to produce a glass-ceramic article which is at least 50 percent crystalline. The crystalline articles produced by the method described in U.S. 2,920,971 generally are characterized by a coefficient of expansion which is lower than that of the parent glass.

Glasses having a semi-crystalline surface layer are described in U.S. Pat. 3,253,975. The glasses described in this patent have a surface compression zone due to the fact that the crystalline phase has a lower coefficient of expansion than the interior glass phase, thereby causing surface compression upon cooling of the partially crystallized article from its crystallization temperature to room temperature.

Considerable research is being conducted on glass-ceramics and methods of improving same. One technique recently investigated involves the chemical strengthening of glass-ceramics by ion exchange of a large alkali metal ion of the glass-ceramic. In the Journal of the American Ceramic Society, vol. 50, No. 4, of April 1967, at page 181 et seq., appears an article by Beall, Karstetter and Rittler discussing the chemical strengthening of stuffed beta-quartz glass-ceramics. The technique described therein involved crystallizing a glass material to form a glass-ceramic and subsequent treatment with an alkali metal salt to exchange an alkali metal ion of relatively large ionic diameter for a smaller ion of the glass-ceramic in an effort to improve or increase the strength of the glass-ceramic article. Other work along this same line was reported by Karstetter and Voss in the Journal of the American Ceramic Society, vol. 50, No. 5, of March 1967, at pages 133 et seq.

It is well known that by developing compression at the surface of an article which is balanced by tension within the interior of the article strength of the article may be enhanced. It is also well recognized that glass-ceramic articles which have their surfaces in tension are not only weak but are subject to crazing which occurs to relieve intra-body stresses.

Several workers in the art, including the applicant, have disclosed in the past methods for improving the strength of glass-ceramic articles by inducing surface compression. Preferential surface crystallization and thus surface compression have been induced before, but until the present discovery it had not been possible to produce an article having uniformly composed randomly-oriented crystals disposed in uniform concentration throughout a glass-ceramic body so that the articles are characterized by surface compression, interior tension but a uniform thermal expansion coefficient at the surface and in the interior.

U.S. Pat. No. 3,464,807 by Pressau teaches a method of producing crystallization more rapidly and completely at the surface than the interior of an article by a thermal gradient technique. The glass composition disclosed therein when subjected to the thermal gradient heat treatment develops crystals of silica-O at and near the surface of the glass article. The silica-O crystals, since they exhibit a lower coefficient of thermal expansion than the base glass composition, develop a surface compression zone upon cooling from the crystallization temperature which increases the strength of the article. The crystals developed are randomly-oriented and relatively small compared with crystals produced by older techniques. The interior of the articles is glassy rather than crystalline.

U.S. Pat. No. 3,464,880 by Rinehart teaches a method of producing crystallization selectively at the surface of an article by selectively nucleating the article at its surface. By treating the surface of a glass article with a nucleating compound nucleation sites are developed at the surface. Crystallization which begins at these sites progresses toward the interior of the article developing an article with greater crystallinity and thus lower coefficient of thermal expansion at the surface. Upon cooling this difference in thermal expansion coefficient causes a surface compression to develop which increases the strength of the article. The characteristic crystal structure developed is perpendicular to the glass surface with parallel needle-shaped crystals. The interior of the article is glassy rather than crystalline.

U.S. Pat. No. 3,454,386 by the applicant teaches a method of producing crystallization more rapidly and completely at the surface than the interior of an article by a selectively effective electron radiation technique. The glass compositions disclosed therein when subjected to the high-energy radiation disclosed permit penetration of the radiation only a short distance inward from the surface and within that zone selected metallic ions reduced. Upon heating such reduced metal ions coagulate to form nuclei for crystallization sites and upon heating crystals form out from each site. These crystals, being silica-O, have a lower coefficient of thermal expansion than the base glass composition and upon cooling a surface compression zone develops increasing the strength of the article. The crystals developed are randomly-oriented and relatively small compared with crystals produced by earlier techniques. The interior of the article is glassy rather than crystalline.

Wagstaff, F. E., et al., "The Influence of $H_2O$ and $O_2$ Atmospheres on the Crystallization of Vitreous Silica," Physics and Chemistry of Glasses, 5, (3), June 1964, discusses the utility of water to restore the stoichiometry of reduced glasses by providing a source of oxygen and by acting as a hydroxyl source or "mineralizer" to initiate surface crystallization which then proceeds toward the interior of the glass by a growing front of crystallization. Such crystallization is typically referred to as "surface crystallization" and the resulting crystal structure is characteristically perpendicular to the glass surface with parallel needle-shaped crystals. The interior of such articles is glassy rather than crystalline. The structure is like that of Rinehart's examples.

The state of the prior art can be summarized as follows:

Two distinctly different types of crystallization phenomena are known. "Bulk crystallization" or "whole body crystallization" is crystallization initiating from nucleation sites disposed throughout the body of glass to yield randomly-oriented crystals of substantially uniform composition disposed in a glass phase which may constitute from less than one to more than 75 volume percent of the glass ceramic.

"Surface crystallization" is crystallization initiated at surface sites which progresses toward the interior of the body by crystal growth to yield a columnar crystal structure with the principal axis of crystal orientation normal to the surface and substantially complete crystallinity at the surface and inward to the extent of the crystal growth front, which is a relatively sharp line of demarcation between the surface crystalline zone and the interior glassy region. The fraction of the body which is glass may vary depending upon the extent of crystal growth but in any event the glassy phase and the crystalline phase are not substantially intermixed.

It has been known that surface compression is desirable to enhance strength and eliminate surface crazing. It has been known that by producing an article crystalline at its surface and glassy inside surface compression can be induced by cooling from crystallization temperatures when the crystal phase has a lower coefficient of thermal expansion than the glassy phase. Methods for producing glass-ceramics which are crystalline at their surfaces and glassy inside are known as described above. It has been known that a strengthened glass-ceramic of the prior art having a glassy interior loses its strength upon heating above the glass transformation or strain temperature which is well below the temperature at which the strength of the crystal phase itself would be lost.

Accordingly, it is the objective of this invention to provide a method for making improved glass-ceramic articles which have superior surface compression and thus superior strength and superior craze resistance and which retain such improved characteristics at elevated use temperatures above the strain point of the base glass.

SUMMARY OF THE INVENTION

Strengthened glass-ceramic articles having randomly-oriented crystals of substantially uniform composition disposed substantially uniformly throughout the glass-ceramic body are characterized by a surface compression and interior tension induced by the earlier time of crystallization of the surface relative to the interior for compositions having a crystalline phase of lower specific volume than the corresponding glass phase, and induced by earlier crystallization of the interior relative to the surface for compositions having a crystalline phase of greater specific volume than the corresponding glass phase. Relative rates of crystallization are controlled by relative water content at the surface and the interior. The difference of water content at the surface less that for the interior should have the same sign as the difference of the specific volume of the composition's glassy phase less the specific volume of the composition's crystalline phase.

Realizing the two species of the method invention, which differ based upon the relative specific volumes of the crystalline and glassy phases of the compositions employed, the discussion to follow will, except where indicated, be confined for convenience only to embodiments of the invention relating to compositions wherein the crystalline phase has a lesser specific volume than the glassy phase.

Strengthened glass-ceramic articles having randomly-oriented crystals disposed substantially uniformly throughout the glass-ceramic body are produced by subjecting a crystallizable glass containing an effective amount of uniformly distributed nucleating agent to a water-containing atmosphere at a temperature near or above the strain point of the crystallizable glass but below the peak crystallization temperature of the glass to develop crystal nuclei throughout the glass body while diffusing water into the glass body then heating the glass at a higher temperature for a period of time sufficient to develop randomly-oriented crystals at the surface and in the interior of the body until substantially complete crystallization is developed throughout the body with such completion of crystallization occurring at an earlier time at and near the surface of the body than in the interior such that the surface is placed in compression while the article remains at the crystallization temperature. Earlier surface shrinkage and rigidity while the interior glass can yet flow to relieve stress followed by interior crystallization establishes the stress of surface compression and interior tension. Upon cooling the surface compression is not lost as the coefficient of thermal expansion for the surface crystalline material is substantially equal to that of the interior crystalline material.

Strengthened glass-ceramic articles having the above-described characteristics are produced with greater strength, and, when a high temperature ultimate crystal phase is formed, with greater thermal stability and having differing appearance by the method already described and further including the added step of thoroughly drying the glass prior to the heat and water treatment.

Drying is typically accomplished at high molten glass temperatures before the glass article is formed. With compositions exhibiting two or more crystal forms it is desirable to establish a sufficiently steep water content gradient from the glass surface to the interior or otherwise make provision so that complete transition to a second higher temperature stable crystalline phase occurs at the surface prior to complete crystallization from the glass to a first metastable crystalline phase occurs in the interior. For example, strengthened opaque and opalescent glass-ceramics may be produced. A glass-ceramic which is $\beta$-spodumene at the surface and $\beta$-eucryptite in the interior could be formed in contrast to a transparent glass-ceramic which was $\beta$-eucryptite throughout.

Using a composition which has a crystalline phase of greater specific volume than its glassy phase it is desirable to thoroughly saturate the glass with water, as by steam treatment at low temperatures (60–500° C.) prior to nucleation in a relatively dry environment to establish a lesser water content at the surface than in the interior prior to crystallization at an elevated temperature.

The substantially complete crystallization which is desired throughout the glass-ceramic body is that condition of crystallization in which the volume percent of crystals is substantially uniform at the surface and in the interior. Uniform crystallinity throughout is evidenced by a uniform coefficient of thermal expansion throughout and is possible even though the volume percent of crystals may not closely approach 100 percent. It is therefore possible to terminate the higher temperature treatment for crystallization at a time which will yield an article of controlled surface compression and a controlled effective coefficient of thermal expansion throughout according to the combined effects of the crystal phase and the glassy phase.

Crystallization of glass is generally accomplished at elevated temperatures near the softening point of the glass, i.e., generally above about 1400° F. The relative humidity of the atmosphere of furnaces operated in the range of 1400° F. and higher is, of course, very low. It has now been discovered that maintaining substantially a constant concentration of water at least as great in the surface as in the interior of the article during crystallization, e.g., maintaining an equilibrium between the moisture of the atmosphere and the article, produces a bulk crystallized article having a craze-free surface indicating the absence of tension at the surface. A similar result can be achieved by coating the glass prior to crystallization with a coating substantially impervious to moisture which prevents moisture escape from the surface during crystallization.

It has further been discovered that a strengthened bulk crystallized article can be readily produced by maintaining about the article immediately prior to or during crystallization, an atmosphere having a higher partial pressure of water vapor than the water vapor pressure of the glass article at the temperature involved. Generally, to introduce moisture into the surface of a glass at a useful rate, it is necessary to have the glass at an elevated temperature, for example, within 200° C. of the transformation temperature. Thus, no difficulty is experienced in introducing water into the surface of a glass during treatment inasmuch as the crystal nucleation temperature generally used for the production of glass-ceramic articles is near or exceeds the transformation temperature of the glass and the peak crystallization temperature is generally greater.

The beneficial effect of moisture is believed to come about in the following way. All glasses produced under commercial conditions of manufacture contain a small amount of dissolved water, on the order of 0.01 to 0.1 percent by weight. Attention is directed to the works of Dr. Horst Scholze which discuss the normal water content of a variety of typical glasses; H. Scholze et al., "Der Einbau des Wassers in Glasern," Glastechn Ber., 32 (1959), 381–86, and 421–26, H. Scholze, "Gases and Water in Glass," Glass Industry (1966).

Water is probably present as silanol groupings (—SiOH) distributed throughout the bulk of the glass. At elevated temperatures (roughly from the strain point upwards) the proton of the silanol group acquires enough mobility to be capable of diffusion through the glass by migrating from one oxygen ion to another, probably in exchange for sodium ions, which are even more mobile at the temperatures in question. This process has no practical significance except in the region of the surface, where silanol groups can react in pairs to release molecules of water:

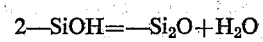

$$2\text{—SiOH} = \text{—Si}_2\text{O} + \text{H}_2\text{O}$$

In this manner, glass which is heated in an atmosphere of low humidity normally loses much or all of its water content, to a depth determined by time, and by the effective diffusion coefficient for water in the glass at the temperature in question. In case of crystallizable glasses, it is theorized that this loss of water will retard the crystallization of the surface region of the glass, because water is an efficient catalyst for crystallization. In the literature of mineralogy, this property of water is recognized by speaking of it as a "mineralizer." The retardation of crystallization at the surface may have serious consequences if the crystallization is accompanied by a decrease in thermal expansion coefficient, the uncrystallized or partly crystallized surface region going into a state of tension as the article cools after the crystallization treatment. It is this state of tension that produces the phenomenon of "crazing"; that is, the generation of an intersecting pattern of cracks on the surface, often accompanied by flaking of material from the surface. It is theorized, therefore, that the moist furnace atmosphere required for the practice of this invention has the effect of preventing the loss of surface moisture from the glass, so that the surface retardation of crystallization does not occur, and the development of surface tension stresses is prevented.

The relative humidity of the furnace or other device used for heating the glass immediately prior to or during crystallization can be readily increased to an effective level by flushing said furnace with air or an inert gas which has been saturated with water at a lower temperature.

The enhancement of strength is believed to come about by increasing the crystallization rate of the surface of an article above the crystallization rate of the interior. When the moisture content of the furnace atmosphere is high enough to lead to absorption of water by the glass, the surface will have a greater concentration of water than the interior of the article. The surface region can then become crystallized while the interior is still glassy. Many, and perhaps most, of the crystallizable glasses shrink appreciably during crystallization, so the early crystallization of the surface must be carried out at a temperature high enough so that the still-glassy interior can flow enough to prevent the generation of excessive tensile stresses in the surface. As heat treatment continues, the interior regions ultimately crystallize as well, but the shrinkage of the interior leads to stresses which cannot be released by flow of the surface, since the surface regions are already crystalline and rigid. The end result, therefore, is an article with a thin, continuous surface layer in a state of high compression, while the interior contains one or more regions in tension though both regions are the same material having the same degree of crystallinity and the same coefficient of thermal expansion. The compression of the surface leads to higher strength, as is well known.

It is observed that this strengthening effect is independent of temperature. In this respect, the product of this invention is unique; all previously practiced methods of producing surface compression lose their effectiveness either temporarily or permanently when the article is reheated. Glass-ceramics formed by the methods of this invention acquire surface compression during high temperature crystallization by differential crystallization rather than by partial crystallization followed by cooling. Thermally-tempered glasses lose their surface compression immediately if heated to the annealing range; and gradually at much lower temperatures. Chemically tempered glasses of the ion exchange type are also subject to loss of surface compression when heated, both by viscous relaxation and by disappearance of the ion concentration gradients which are responsible for the stress. In cases where the surface compression arises from a difference in thermal expansion coefficient of surface and interior, the stress obviously disappears as the article is heated toward the temperature from which the glass was cooled to develop the stress. In the present case, however, there is no difference of composition or of physical state between surface and interior, and the stresses are therefore retained unchanged up to the temperature limit of stability of the crystalline phases involved.

Articles produced by the strengthening process of this invention are advantageous inasmuch as no additional processing steps are required as in ion-exchange strengthening to obtain the surface compressive layer. Articles strengthened by the techniques of this invention have strengths of 30,000 p.s.i. and above and possess substantially the same composition throughout the whole glass article in contrast to glass-ceramics strengthened by ion-exchange techniques.

Glass compositions useful in this invention include those compositions which can be crystallized under controlled conditions. The operativeness of this invention is not dependent upon any particular composition although strengthening has been found to be particularly enhanced and the prevention of crazing has been found to be especially effective for those glass compositions which undergo a volume shrinkage upon crystallization and wherein the coefficient of thermal expansion of the crystal phase is lower than that of the glassy phase. Glass-ceramics having the greatest commercial use presently are those in which the crystalline phase has both a lower specific volume and a lower coefficient of expansion than the glassy phase.

Glass compositions useful in this invention include those which can be crystallized to yield the following crystals:

Spodumene ($Li_2O$-$Al_2O_3$-$4SiO_2$)
Beryl ($3BeO$-$Al_2O_3$-$6SiO_2$)
Alpha-cordierite ($2MgO$-$2Al_2O_3$-$5SiO_2$)
Anorthite ($CaO$-$Al_2O_3$-$2SiO_2$)
Gahnite ($ZnO$-$Al_2O_3$)
Willemite ($2ZnO$-$SiO_2$)

Glass compositions which can be crystallized to form the above crystals are disclosed in U.S. Pat. No. 2,920,971. The methods of crystallization are also described therein.

Another crystal phase which has found utility in present glass-ceramics is beta-eucryptite ($Li_2O$-$Al_2O_3$-$2SiO_2$)

Glass compositions and crystallizing techniques useful for forming beta-eucryptite glass-ceramics are disclosed in U.S. Pats. 2,998,675 and 3,253,975.

The above description is not intended to be exclusive of glass compositions useful in the instant invention. It is intended, however, to incorporate by reference all the compositions disclosed in the above patents. Also, it is intended to incorporate herein by reference all the compositions disclosed in the articles in The Glass Industry, July and August 1966 issues, by Dr. M. Tashiro.

Glass compositions which have found utility in producing useful glass-ceramics generally include silica and frequently alumina and an alkali metal oxide as a flux, especially lithia. Crystalline phases resulting from the crystallization of lithia-alumina-silica glasses in commercial articles are generally spodumene or beta-eucryptite. Glass-ceramic articles containing such crystals are generally characterized by a low thermal coefficient of expansion, relatively high modulus of rupture, and a relatively high softening temperature.

Numerous nucleating agents have been found to be effective in catalyzing the crystallization of crystallizable glass compositions. The preferred nucleating agents are $TiO_2$, $ZrO_2$, and $P_2O_5$, although numerous nucleating agents are disclosed by I. Sawai, Glass Technology, II (6) 1961, at page 243, incorporated herein by reference. Combinations of nucleating agents as described at col. 5 of U.S. Pat. No. 3,418,156 are useful and are included herein by reference.

Compositions intended for inclusion herein include those which are characterized by auto nucleation.

DESCRIPTION OF THE PREFERRED EMBODIMENTS

Strengthened glass-ceramic articles having insubstantial surface tension to high surface compression and having randomly oriented beta-eucryptite crystals disposed substantially uniformly throughout are produced using compositions and treatments which yield visible and infrared transparent products.

The following composition is illustrative of a glass composition which has been found to be particularly useful in the practice of this invention:

| | Percent by wt. |
|---|---|
| $SiO_2$ | 45–72 |
| $Al_2O_3$ | 15–35 |
| $Li_2O$ | 3–10 |

A glass composition of this type may be effectively nucleated with 1 to 20 percent by weight of titania although for bulk crystallization the titania should be present in at least 3 percent by weight unless an additional nucleating agent such as zirconia is present. Glasses based on the above composition and containing about 1 to 5 percent zirconia and about 1 to 5 percent $TiO_2$ as nucleating agents have been found to be particularly useful in producing glass-ceramic articles. Also, the inclusion of some $P_2O_5$ have been found to be advantageous, especially in the range of about 1 to 5 percent by weight. Additional ingredients such as magnesia, zinc oxide, potassia, soda, and typical fining agents may be included in minor amounts, that is, quantities less than about 3 percent by weight. Crystallizable glass compositions substantially similar to the above are described in U.S. Pat. No. 3,282,712, said description being incorporated herein by reference.

The following glass composition has been found to be especially effective in the practice of this invention:

| | Percent by wt. |
|---|---|
| $SiO_2$ | 60–72 |
| $Al_2O_3$ | 17–22 |
| $Li_2O$ | 3–5 |
| $Na_2O$ | 0–2 |
| $K_2O$ | 0–2 |
| $MgO$ | 0–2 |
| $P_2O_5$ | 0.5–2.5 |
| $ZnO$ | 0.5–2.5 |
| $ZrO_2$ | 0.5–3.0 |
| $TiO_2$ | 0.5–3.0 | with $TiO_2+ZrO_2$ being at least 3.0 percent by weight and, preferably, the alkali content ($Na_2O+K_2O$) is about 0.5 to about 1.0 percent by weight.

Processing crystallizable glass articles according to the instant invention utilizes the usual nucleation and crystallization techniques developed in the art and, in addition, means for crystallizing a crystallizable glass without substantial loss of water from the surface portions of the glass relative to the interior so that water content near the surface is at least as great as the interior following nucleation. Desirable control of water content is best obtained by increasing the moisture content of the surface areas of the crystallizable glass prior to or during crystallization preferably while nucleating the crystal sites.

Nucleation and crystallization techniques have been adequately described in the literature and patents referred to hereinabove. The techniques referred to in those patents and articles may be practiced with the instant invention.

The beneficial characteristics of glass-ceramics above-described are obtained by conducting crystallization in an atmosphere containing sufficient moisture to maintain an equilibrium between the water vapor of the atmosphere and the water of the surface portions of the glass article after establishing increased water content at or near the surface during nucleation. The correct amount of water vapor to increase strength and to prevent crazing can be readily determined experimentally by crystallizing a glass composition in atmospheres containing increasing water vapor content until the crystallization proceeds to yield some surface compression and no surface crazing is noted.

Surface moisture may be introduced in the atmosphere surrounding the glass article by the introduction of liquid water into the furnace or other equipment heating the glass during nucleation and crystallization, or water in the vapor phase may be introduced by admission of steam, or by saturating a gas such as nitrogen and flushing a furnace with the water-saturated gas. The last-mentioned method offers perhaps the best control of moisture content; however, the first two mentioned techniques may offer a desirable approach towards obtaining a maximum moisture content in the atmosphere for the purpose of promoting surface compression in the glass-ceramic produced according to this invention.

In Examples I–III glass having the following composition was utilized:

| Ingredient: | Quantity (weight percent calculated) |
|---|---|
| $SiO_2$ | 67.48 |
| $Li_2O$ | 3.86 |
| $Al_2O_3$ | 20.13 |
| $Na_2O$ | 0.74 |

TABLE—Continued

| Ingredient: | Quantity (weight percent, calculated) |
|---|---|
| $K_2O$ | 0.22 |
| $MgO$ | 0.80 |
| $Cl_2$ | 0.07 |
| $P_2O_5$ | 1.57 |
| $ZnO$ | 1.46 |
| $Sb_2O_3$ | 0.29 |
| $ZrO_2$ | 1.51 |
| $Fe_2O_3$ | 0.027 |
| $TiO_2$ | 1.83 |
| $F_2$ | 0.09 |

Example I

A glass of the above composition was melted, formed, and ground and polished in the conventional manner to form plate glass. Samples ⅛″ x ⅛″ x ¾″ were prepared. The density of the glass was 2.42 grams per cubic centimeter.

The glass samples were bulk crystallized by heating in a furnace at a temperature of about 790° C. for a period of 6 hours. During the heat treatment, the furnace was flushed with nitrogen saturated with water at a temperature of about 88° C. to about 98° C. Saturation with water was achieved by passing nitrogen through a container of water at a temperature of 88° C. to about 98° C. The nitrogen flow rate was maintained at a sufficient rate to flush the furnace but at a sufficiently slow rate to avoid cooling the glass samples. The mole fraction of water present in the gas passed through the furnace was from about 0.7 to about 0.9 mole of water per mole of gas, the gas being comprised of nitrogen and water.

At the end of the 6 hour period, the glass samples were removed from the furnace while hot and allowed to cool to room temperature. The glass samples were crystalline, as evidenced by their density of 2.52 grams per cubic centimeter. Also, the glass samples were examined by birefringence techniques to detect the presence of stress. It was found that the surface of the samples was in a state of deep compression to a depth of about 60 microns while the interior of the sample was in a state of tension. The accompanying drawing illustrates the stress pattern exhibited by the crystallized samples. The interior of the sample exhibited three zones of tension: two highly stressed zones near the compression zones and a central zone of moderate tensile stress.

The experiment was repeated numerous times with substantially the same results being achieved each time.

For the purposes of control, similar glass samples were prepared and heat treated for a period of 6 hours at a temperature of about 790° C. in the substantial absence of water vapor.

The furnace containing the control samples was flushed with nitrogen which had been saturated with water at room temperature. The water content of the gas was about 0.04 mole of water per mole of gas.

At the end of the 6 hour period, the samples were removed from the furnace while hot and allowed to cool to room temperature. Severe crazing of the surfaces of the samples was noted. Also, the samples were examined by birefringence techniques for the presence of stress. The samples exhibited a neutral stress pattern, showing no compression or surface zones in contrast to the samples illustrated by the figure attached hereto.

Example II

Another series of samples of the above glass composition were crystallized in the presence of moisture to determine quantitatively the strength improvement resulting from such treatment.

Samples of glass approximately 2″ x 2″ x ⅛″ were prepared. These samples were heat treated for 8 hours at a temperature of about 740° C. in a moist atmosphere. The moist atmosphere was provided by passing nitrogen through water at 100° C. and then passing the water-saturated through the furnace containing the glass samples. The flow rate of water vapor was calculated as 3.3 liters per minute at a temperature of 100° C. The cavity of the furnace was 11.3 liters.

After 8 hours of heat treatment, the glass samples were removed while hot and allowed to cool to room temperature. The samples exhibited no crazing and, upon being subjected to fracture testing under ring loading technique, an average strength of 29,400 p.s.i. was attained for abraded samples.

A control sample which had been heat treated at about 740° C. for 9 hours in a dry atmosphere, i.e., an atmosphere in which no steps were taken to increase or decrease its relative humidity, had a badly crazed surface and a strength of 2,800 p.s.i. A sample of glass which had not been heat treated, that is, not crystallized, had a strength of 5,800 p.s.i. when tested by the ring loading method. The reduction in strength caused by crystallization is apparently due to surface crazing inasmuch as the crystallized glass would otherwise be expected to be at least as strong as the glass before crystallization.

Example III

Samples of glass were heat treated in a moist atmosphere at 740° C. under the conditions described in Example II, above, and control samples were heated in a dry atmosphere at 740° C. The heat treatment of the samples ranged from about 2 to about 8 hours. The results of an X-ray examination of the surface of these samples are given below:

| Time (hours) | Percent crystallinity | |
|---|---|---|
| | Moist | Dry |
| 2 | 17 | 0 |
| 4 | 25 | 0 |
| 5 | 34 | 5 |
| 6 | 53 | 11 |
| 7 | 90 | -- |
| 8 | 90 | 90 |

The percent crystallinity was estimated from line intensity and glass halo data. There is a signficant penetration of X-rays up to approximately 1 millimeter. The X-ray patterns of the west and dry samples were identical and showed silica-O (solid solution of beta-quartz and beta-eucryptite). The results showed that an enhancement of crystallinity occurred at the surface of samples treated in a moist atmosphere.

The abrasion technique utilized in the examples throughout involved masking a glass sample (⅛″ x 2″ x 2″) to expose a circle of ½″ diameter in the center of the sample. The exposed portion was then subjected to "sandblasting" by 100 grit Alundum (aluminum oxide) suspended in air exhausted from 30 p.s.i.g. pressure. The blast period is about 5 seconds and a total of 2 cubic centimeters of Alundum is utilized.

The optical stress measurements reported in the examples throughout, both tensile stress and compressive stress, are measured by birefringence using a graduated quartz wedge looking through 0.020 inch sections of the 0.125 inch thick treated glass plates. Using a diamond cutting wheel, a 0.020 inch section is cut with the nearest cut being no less than 0.5 inch from the sample edge. The 0.020 inch section is then mounted on a microscope slide so that the 0.020 inch dimension is normal to the surface of the microscope slide. Then index matching fluid, viz, oil having the same index of refraction as the glass section, is placed over the glass surface. The section, thus mounted on the microscope slide, is then placed on the stage of a petrographic microscope (one containing a polarizer built into the optical system below the stage surface) equipped with a quartz wedge. The quartz wedge is calibrated in millimicrons of relative retardation for the mutually-perpendicular components of a plane-polarized light beam. The sample to be measured is viewed by looking at the 0.125 inch surface through the 0.020 inch dimension, viz, the polarized light passes through the 0.020 inch dimension. The zone of the sample which is to be measured is selected and the stress of that zone is measured by looking through that zone. The compressive stress at the surface (compressive stress zone) is measured by looking through the 0.020 inch surface at either edge of the 0.125 inch dimension. The tensile stress of the central interior tensile stress zone is measured by looking through the 0.020 inch surface at the center of the 0.125 inch dimension. The tensile stress of the additional tensile stress zone (intermediate or underlying tensile stress) is measured by looking through the 0.020 inch surface at a location on the 0.125 inch dimension which is between the center and either edge but closer to either edge, e.g., approximately 50 to 150 microns from either edge of the 0.125 inch surface. Since the sample section is 0.020 inch thick, the measured values are multiplied by 50 to express the stress in terms of millimicrons per inch. Then the optical rating of tensile stress in millimicrons per inch is converted to mechanical pounds per square inch stress units by multiplying the stress optical coefficient of 2.13, which applied not only for the glass composition listed above in this example but also for most conventional plate and sheet glass.

The load strength tests reported in the examples throughout are conducted using concentric ring loading on the two-inch square 0.125 inch thick test plates. The larger circular ring has an internal diameter of 2 inches whereas the smaller circular ring has an internal diameter of 1 inch. Both concentric rings have knife edges which contact the glass surfaces in a direction normal to the 4 square inch area thereof. The load speed is 0.02 inch per minute, and the reported strength is the average stress (pounds per square inch) at which failure (glass breakage) occurs for the tested samples, all of which are identically treated for strengthening. This stress in pounds per square inch is arrived at by multiplying the actual load, pounds by the stress conversion factor, which is 34.88, which applies to 0.125 inch thick plate glass within the realm of experimental error.

The 2 inch x 2 inch samples are actually slightly larger than 2 inches per side in order to have a slight overhang, e.g., 1/16 inch, when resting on the 2-inch ring.

In Examples IV–VIII glass having the following composition was utilized:

| Ingredient: | Quantity (weight percent) |
|---|---|
| $SiO_2$ | 70.8 |
| $Li_2O$ | 4.15 |
| $Al_2O_3$ | 19.0 |
| $Na_2O$ | .61 |
| $K_2O$ | .26 |
| MgO | 0 |
| $Cl_2$ | <.01 |
| $P_2O_5$ | 0 |
| ZnO | 1.57 |
| $Sb_2O_3$ | .45 |
| $ZrO_2$ | 1.52 |
| $Fe_2O_3$ | .06 |
| $TiO_2$ | 1.46 |
| $F_2$ | .19 |

Example IV

Several plates of glass, each having approximate dimensions of 12 inches x 12 inches x 0.22 inch, were vertically suspended by a rack in a heating chamber.

The chamber comprised a square box 14 inches inside width and 20 inches high flange mounted at its base to a shallow square plenum and in communication with the plenum through a 14 inch square opening having disposed across it a gas distribution plate perforated with a 9 x 9 array of 9/16 inch holes having mounted through it 1/2 inch bolts holding washers prepared from U.S. No. 100 mesh stainless steel screen material; the chamber structure itself was stainless steel. Eight 230 volt, 1015 watt rectangular Nichrome-wound muffle furnace elements of standard design (Electro-Application Type X–75) were mounted about the four vertical sides of the chamber and low density insulation bricks placed in surrounding relationship to the chamber. A lid for the chamber consisted of a section of 2 inch thick insulation block (Insulblock). Steam and air lines were connected to the plenum with a flow gauge on the air line and a pressure gauge on the plenum. A fluidizable powdery heat exchange material (Aerocat TS-150, American Cyanamid Company) was placed in the box.

After the samples were placed in the chamber, heat was gradually increased while air was forced through the chamber from the plenum to fluidize the powder; after the temperature was sufficient to prevent condensation, air flow was gradually reduced and air replaced by steam. The temperature was raised to 700° C. and maintained at that temperature for four hours.

The glass was permitted to cool, then removed and examined. No crystallization either near the surface or in the interior was apparent for any sample by X-ray and refractive index determination. It may be concluded that only nucleation occurred during treatment.

To determine the effect of nucleation in the presence of water 2 inch x 2 inch pieces were cut from the 12 inch x 12 inch plates which had been steam and heat treated. These pieces were subjected to further heat treatment in the dry environment of an ordinary electric muffle furnace. Table I summarizes the treatment conditions and the effect of such treatments.

TABLE I.—CRYSTALLIZATION OF STEAM-TREATED GLASS

| Temperature (°C.) | Time (hours) | Depth of compression (microns) | Surface compression (p.s.i.) | Center index of refraction | Strength equals compression plus base strength (p.s.i.) |
|---|---|---|---|---|---|
| 800 | 0.5 | 57 | 12,000 | 1.512 | 23,000 |
|  | 1.0 | 130 | 21,000 | 1.524 | 32,000 |
|  | 2.0 | 105 | 12,000 | 1.528 | 23,000 |
| 780 | 1.0 | 100 | 19,000 | 1.512 | 30,000 |
|  | 2.0 | 140 | 20,000 | 1.524 | 31,000 |
|  | 3.0 | 120 | 13,000 | 1.528 | 24,000 |
|  | 6.0 | 120 | 13,000 | 1.528 | 24,000 |
| 750 | 4.0 | 80 | 10,000 | 1.512 | 21,000 |

As apparent from Table I when glass-ceramic strengths are compared with base glass strength of 11,000 p.s.i. glass-ceramic strengthening is accomplished when crystallization is carried out in a dry atmosphere when preceded by nucleation in a moist atmosphere. It is also apparent that crystallization is completed earlier at the surface than in the interior of glass nucleated in a moist atmosphere. Since the tabulated strengths are determinations made at room temperature, they reflect thermal expansion strengthening by the mechanism of applicant's earlier referenced patent in those cases wherein substantially complete crystallization has not yet occurred internally. It is therefore observed that a maximum room temperature strength occurs with partial crystallization but, as demonstrated below, such strength is not maintained at elevated temperatures while the full crystalline strength is.

Example V

Three 12 inch x 12 inch plates, as used in Example IV, were placed in the heating chamber as in Example IV and nucleated by steam and heat treatment at 700° C. for four hours. The temperature of the chamber was then raised at a rate of 25° C. per hour to 780° C. and held at that temperature three hours to obtain complete crystallization. The plates were examined as in Example IV and found to be surfaced compressed with properties like the 780° C.—3 or 6 hour treated pieces of Example IV. This test demonstrates that steam treatment throughout nucleation and crystallization in a continuous process is a suitable embodiment of the invention.

Example VI

Eighty 2 inch x 2 inch x 1/8 inch plates were placed in the heating chamber described in Example IV and steam and heat treated at 725° C. for four hours to cause nucleation. The chamber temperature was raised to 750° C. and held for one and one half hours. Half the plates were then removed from the chamber and allowed to cool. The chamber temperature was then raised to 780° C. and held for three hours.

A concentric ring load testing device located in a cylindrical furnace provided a means to test plates at elevated temperatures. Table II summarizes the test results.

TABLE II.—HIGH TEMPERATURE STRENGTH RETENTION OF STEAM TREATMENT STRENGTHENED GLASS-CERAMIC

| Treatment | Modulus of rupture (MOR), in p.s.i. at — | | |
|---|---|---|---|
| | Room temperature | 400° C. | 705° C |
| None (parent glass) | 11,000 | | |
| 4 hours, 725° C.; 1.5 hours, 750° C.[1] | 68,000 | 45,000 | 15,500 |
| 4 hours, 725° C.; 1.5 hours, 750° C.; 3 hours, 780° C.[2] | 44,500 | 41,000 | 39,000 |

[1] Glassy interior; 65 micron layer in compression; 33,650 millimicrons inch surface stress.
[2] Fully crystallized; 138 micron layer in compression; 10,700 millimicrons/inch surface stress.

As apparent in Table II fully crystallized, a glass-ceramic strengthened by the described method retains its strength at high temperatures while glass strengthened by the method, which is not fully crystallized, loses strength at high temperature despite a higher room temperature strength which results from the before recognized strengthening caused by cooling a glass-ceramic which is crystalline at the surface but glassy inside. Since the principal uses of glass-ceramics are high temperature uses, this beneficial retention of strength at high temperature has particular utility. Even where crystallization is not continued to completion as in the intermediate treatment of this example, the present invention provides an alternative method to Pressau's or the applicant's prior methods for forming strengthened glass-ceramic articles with glassy interiors and surface zones of randomly-oriented crystals. "Fully" or "completely crystallized" refers to crystalline contents exceeding about 90 percent by volume with preferred full crystallinity exceeding 95 percent and best results are observed when crystallinity exceeds 99 percent.

Example VII

Three samples each comprising 36 plates, 2 inches x 2 inches x ⅛ inch, were steam and heat treated at 725° C. as above. One sample was removed from the chamber after four hours, one sample removed after 6 hours and the third sample removed after 8 hours. All were cooled to room temperature. All three samples were then heated to 750° C. and held at that temperature 1.5 hours then further heated to 780° C. and held 2 additional hours. Table III summarizes the test results.

TABLE III

| Time at 725° C. (hours) | Further heat treatment | Depth of compression (microns) | Surface compression (millimicron/inch) | Modulus of rupture (p.s.i.) |
|---|---|---|---|---|
| 0[1] | None | 0 | | 13,000 |
| 4 | do | 73 | 33,000 | |
| 6 | do | 89 | 31,000 | |
| 8 | do | 138 | 31,000 | |
| 4 | (1.5 hours at 750° C.; 2 hours at 780° C.) | 177 | 13,500 | 39,000 |
| 6 | | 179 | 12,775 | 44,000 |
| 8 | | 203 | 12,775 | 51,000 |
| 8[2] | Additional 1 hour at 1,100° C. (dry) | | | 22,000 |

[1] Parent glass, no crystallization.
[2] Added treatment at 1,100° C. converted the transparent (amber) β-eucryptite to opalescent spodumene with loss of strength during crystal rearrangement.

As apparent from Table III increased nucleation time, which is the steam treatment at or near the glass transformation temperature, is preferred to increase compression layer depth and modulus of rupture, other things being equal.

Example VIII

While the most preferred results are obtained with full crystallinity, exceeding 90 percent by volume throughout the glass-ceramic body, certain utilities are noted with lower crystalline content as demonstrated in this example.

Several test plates, 2 inch x 2 inch x ⅛ inch, and several test blocks, 1 inch x ½ inch x ¼ inch, were placed in the previously described heating chamber and treated with steam and heat at 725° C. for 6 hours followed by treatment at 750° C. for 1.5 hours. Measurement of test blocks at this point indicated no shrinkage and hence no crystallization. The plates and blocks were replaced in the chamber and the temperature raised to 780° C. Specimens were removed at various time intervals. Table IV summarizes the results.

TABLE IV

| Time at 780° C. (minutes) | Modulus of rupture (p.s.i.) | Refractive index | Volume percent Crystalline | Coefficient of thermal expansion (/°C.) |
|---|---|---|---|---|
| 32 | 65,800 | 1.5173 | 27 | |
| 27 | 64,700 | 1.5205 | 44 | $0.00 \times 10^{-7}$ |
| 25 | 58,900 | 1.5240 | 61 | $-7.0 \times 10^{-7}$ |

With partially crystallized glass-ceramics prepared as here described higher room temperature strength is obtained as noted in Examples IV and VI, and also, a zero coefficient of thermal expansion is obtainable. This compares with thermal expansion coefficients of $38 \times 10^{-7}/°$ C. for the parent glass and $-17 \times 10^{-7}/°$ C. for fully crystallized β-eucryptite. Of course as noted in Example VI such partially crystallized materials are not stable at high temperatures near 700° C. At 705° C. the interior crystallizes completely within 8 days yielding a fully crystallized product which retains strength as in Example VI but having the coefficient of thermal expansion of the crystal phase alone.

Since coefficients of thermal expansion are generally not constant but vary with temperature, the coefficients here reported are defined as the slope of a secant drawn through the length-temperature curve at 25° C. and 400° C. The actual coefficient for the 44 percent crystalline sample ranges from $-4 \times 10^{-7}/°$ C. at 25° C. to $+4 \times 10^{-7}/°$ C. at 400° C.

Other compositions—Example IX

The principles of the present discovery may be applied to a wide variety of glass compositions which are crystallizable, shrink or expand upon crystallization, exhibit increasing viscosity with increasing crystal content and are permeable to water at temperatures at or below their peak crystallization temperature preferably at or near the glass transformation temperature which characteristics are evidenced by the nucleation or transformation temperature and the peak crystallization temperature being lowered when the glass has been subjected to water treatment.

Glasses having the compositions indicated in Table V were subjected to the treatment of this invention.

TABLE V

| Ingredient | Composition (weight percent) | | | | | | | | |
|---|---|---|---|---|---|---|---|---|---|
| | A | B | C | D | E | F | G | H | I |
| $SiO_2$ | 70.05 | 70.1 | 71.0 | 58.0 | 42.0 | 57.2 | 56.0 | 74 | 41.3 |
| $Li_2O$ | 2.57 | 2.6 | 4.1 | 4.4 | | 3.4 | | | |
| $Na_2O$ | 0.44 | 0.4 | | 0.5 | 12.5 | | | | 4.1 |
| $K_2O$ | 0.62 | 0.6 | | 0.5 | 6.2 | | | | 18.5 |
| CaO | Trace | | | | | | | | |
| MgO | 2.62 | 2.6 | | | | 1.0 | 15.0 | 3.5 | |
| BaO | | | | | | | | | |
| $Al_2O_3$ | 17.94 | 17.9 | 19.0 | 27.8 | 31.2 | 25.3 | 20.0 | 16.5 | 28.1 |
| $B_2O_3$ | Trace | | | | | | | | |
| $Fe_2O_3$ | 0.054 | | | | | | | | |
| $TiO_2$ | 4.37 | 4.4 | 1.45 | 2.0 | 7.4 | 2.5 | 9.0 | | 7.5 |
| $ZrO_2$ | 0.24 | 0.2 | 1.50 | 2.6 | | 2.0 | | 4.0 | |
| PbO | | | | | 0.6 | | | | |
| ZnO | 0.84 | 0.8 | 1.57 | | | 1.4 | | 6.0 | |
| $As_2O_3$ | 0.14 | 0.5 | Trace | | | 0.5 | | 1.0 | 0.5 |
| $P_2O_5$ | | | | 2.5 | | 6.5 | | | |
| F | | | 0.16 | | | | | | |

Using the differential thermal analysis method described below the glass transition temperature, peak crystallization temperature and peak crystal transformation temperature (if any) were determined for each glass composition as chilled from the molten state in forming, after nucleation in a dry atmosphere and after nucleation in a moist atmosphere. The results of analysis are summarized in Table VI.

Micham Surrey London, U.K. Using a conventional DTA furnace equipped with post thermocouple sample holders (R. L. Stone furnace, Columbia Scientific Co., Austin, Tex.), a powdered sample for testing is placed in a cup with a head of a differential platinum-platinum, 10% rhodium thermocouple embedded in the sample, the other bead being embedded in α-alumina, 200 mg. samples of glass were used each being ground to pass an 80 mesh

TABLE VI.—EFFECT OF WATER VAPOR DURING NUCLEATION ON CRYSTALLIZATION COMPOSITION

| Nucleation treatment temperature | B 720° C. | C 725° C. | D 725° C. | E 725° C. | F 750° C. (2 hrs.) | G 825° C. (2 hrs.) | H 850° C. (2 hrs.) | I 800° C. (2 hrs.) |
|---|---|---|---|---|---|---|---|---|
| None: | | | | | | | | |
| Transition (° C.) | 681 | 668 | 719 | 698 | 696 | (¹) | (¹) | 713 |
| Crystallization (° C.) | 927 | 923 | 890 | 931 | 987 | (¹) | (¹) | 1,064 |
| Crystal transforms (° C.) | 1,130 | 1,100 | | | | (¹) | (¹) | |
| Dry, 4 hours: | | | | | | | | |
| Transition (° C.) | 696 | 688 | 715 | 698 | (¹) | 745 | | (¹) |
| Crystallization (° C.) | 913 | 875 | 883 | 944 | (¹) | 900 | 1,045 | (¹) |
| Crystal transforms (° C.) | 1,030 | 1,070 | 921 | | (¹) | 1,072 | | (¹) |
| Steam, 4 hours: | | | | | | | | |
| Transition (° C.) | 665 | 654 | 690 | 676 | 670 | 740 | | 693 |
| Crystallization (° C.) | 887 | 837 | 873 | 936 | 858 | 888 | 1,039 | 993 |
| Crystal transforms (° C.) | 1,000 | 1,021 | | | 1,030 | 1,063 | | |

¹ Not tested.

The behavior of compositions B and C is quite similar. The glass transition temperature of each is substantially lowered following nucleation treatment in steam. Each exhibits a lowering of the first and second crystallization peak temperatures with steam treatment. Crystallization to β-eucryptite occurs in each instance at the lower crystallization temperature with conversion to β-spodumene occurring in each at the higher peak crystallization or crystal transformation temperature. Glass A commercially available from Corning Glass, should perform as B and C inasmuch as its composition is like B.

Glasses D and E are respectively glasses "F-O" and "C" disclosed by T. Kanbara and M. Tashiro in the presentations of the Seventh Meeting of the Glass Division, Japan Ceramic Association, April 1970. Slight decreases in transition and crystallization temperatures are noted for these glasses when subjected to steam treatment at temperatures suitable for nucleation.

Glass F is similar to the low expansion mirror glass reported in Glastech. Ber, 43 (1970), 127–37 by J. Petzoldt. A large decrease in crystallization temperature is noted for this glass following steam treatment indicating its particular suitability for use in the instant invention.

Glass G is fully described in U.S. Pat. No. 2,920,971 and is commercially available as "Pyroceram" from Corning Glass Works. Slight decreases in transition temperature and crystallization temperatures occur following steam treatment. The ultimate crystal phase is cordierite.

Glass H has been disclosed, Beall and Duke, "Transparent Glass-Ceramics" Jour. Materials Sci., 4, 344 (1969), as a ceramic comprising β-quartz, β-eucryptite and tetragonal zirconia. Incomplete testing due to high temperatures required for conversion of this glass did establish slight reduction of conversion temperature following steam treatment.

Glass I is a kaliophilite or potassium equivalent of the sodium-rich nepheline of glass E. Steam treatment resulted in substantial decreases in transition temperature and peak crystallization. Unless glass E or I are fully crystallized they are not as suited for strengthening by this invention as the preferred compositions here described since their crystalline phases have higher coefficients of thermal expansion than their glassy phases. Fully crystalline they may be strengthened without crazing and maintain their strengths at elevated temperature.

Glass transition temperatures and peak crystallization temperatures were determined by differential thermal analysis using a standard blank of α-alumina for comparison in the technique described in David, D. J., "Introduction to Theory and Application of DTA," Laboratory Equipment Digest (June-August, 1968), Vale Press Ltd., (Tyler equivalent) screen and being retained on a 115 mesh screen so that particle size ranged from 177 to 125 microns. 180 mg. of α-alumina was used. A third direct-reading thermocouple of the same type was positioned between the closely spaced sample holders within the furnace. The entire assembly was heated at a rate of 10° C. per minute and differential temperature monitored against temperature. During heating the furnace was flushed with air or steam. Endothermic transition effects were noted as depressions on the monitored differential temperature, the transition temperature being fixed by the intersection of tangents drawn to the baseline and leading edge of the endothermic depression. Crystallization temperatures were defined by the peaks of exothermic rises in differential temperature being monitored. Heat and steam treatment of plates of glass compositions listed in Table V established the degree of strengthening which could be obtained as predicted from the differential thermal analysis results above.

Plates of glass B, 1 inch x 1 inch x ⅛ inch were heated in a steam fluidized bed comprising a vertically positioned 2½ inch diameter stainless steel tube 5½ inches in length heated by a circular electric resistance module and having a porous stainless steel gas distribution plate at the bottom. Steam treatment for 4 hours at 720° C. followed by one hour at 850° C. yielded an average compression layer depth of 80 microns per inch.

Similar plates of glass D were heated in steam for 2 hours at 725° C., then 2 hours at 800° C. yielding a 160 micron compression layer of 23,300 millimicrons per inch surface compression. By X-ray analysis the surface was largely crystalline while the interior was slightly crystalline. Plates heated in steam for 2 hours at 750° C. followed by heating 2 hours at 825° C. yielded a 180 micron compression layer and surface compression of 8700 millimicrons per inch. By X-ray the plates are highly crystalline throughout. Steam treatment for 2 hours at 750° C. then 800° C. then 825° C. yields compression depth of 220 microns and 8200 millimicrons per inch surface compression.

Plates of glass E were heated in steam for 2 hours at 750° C. then 2 hours at 825° C. then 3 hours additionally 2 hours being at 875° C. to yield a depth of compression of 180 microns and surface compression of 12,000 to 14,000 millimicrons per inch. By X-ray determination the plates were fully crystalline throughout.

Plates of glass F were heated in steam for 2 hours at 750° C. then 2 hours at 800° C. then 2 hours at 850° C. to yield a depth of compression of 180 microns and surface compression of 5670 millimicrons per inch.

A plate of glass G was heated in steam for 40 hours at 770° C. then 42 hours at 800° C. then 41 hours at 830° C. yielding a tension layer at the surface 50 microns deep with full crystallization throughout. Due to limited transparency of the sample the observations were inconclusive.

Plates of glass I were heated in steam for 2 hours at 750° C. then 2 hours at 850° C. after which no crystallinity was noted. After heating in steam for 2 hours at 800° C. then 2 hours at 900° C. the surfaces were partially crystalline and cooling to room temperature caused tension and crazing at the surface. Heating in steam for 2 hours at 850° C. then 2 hours at 1000° C. dry yielded white opaque plates fully crystallized throughout indicating strengthening at room temperature and at elevated temperatures.

In an attempt to define the quantity of water which may practically be transferred into a crystallizable glass near its transition temperature during nucleation and to establish what surface-to-interior water content gradients are suited for carrying out the objectives of this invention the following work was performed.

Example X

One-inch-square, 0.85 mm. thick plates of glass having the composition of Examples IV–VIII were prepared with ground and polished major surfaces. One piece was heated in steam at 680° C., one piece heated dry at 680° C. and one piece heated with steam at 710° C. Each piece was withdrawn at intervals and its infrared optical density to the 2.8 micron band and surface crystallinity determined. Using the method of H. Scholze, referred to above, and a typical decadic extinction coefficient of 40–70 liters/mole/cm. the relative amount of water in samples may be compared. Crystallinity is estimated from index of refraction determinations assuming a linear response of refraction to crystallinity between the 1.5121 for glass to 1.5316 for crystals of the particular composition of this example as measured using an Abbe refractometer. The results of this work are summarized in Table VII.

TABLE VII—WATER ADDITION TO GLASS—INFRARED ANALYSIS

[0.85 mm. thickness; 2.8 micron band]

| Treatment | Optical density[1] | O.D. increment | $\sqrt{time}$ | O.D./$\sqrt{t}$ | Surface crystallinity, percent |
|---|---|---|---|---|---|
| Wet, 680°: | | | | | |
| 0 hrs | 0.294 | | | | None |
| 22 hrs | 0.345 | 0.051 | 4.69 | 0.0109 | None |
| 69 hrs | 0.373 | 0.079 | 8.31 | 0.0095 | None |
| 92 hrs | | | | | 13 |
| 160 hrs | 0.405 | 0.111 | 12.65 | 0.0088 | 38 |
| 235 hrs | ([2]) | 0.128 | 15.33 | 0.0083 | 72 |
| 468 hrs | ([3]) | 0.273 | 21.6 | | 81 |
| Dry, 680°: | | | | | |
| 0 hrs | 0.303 | | | | None |
| 72 hrs | 0.265 | −0.038 | 8.48 | 0.0045 | None |
| 163 hrs | 0.252 | −0.051 | 12.76 | 0.0040 | None |
| 280 hrs | | | | | ([4]) |
| Wet, 710°: | | | | | |
| 0 hrs | 0.300 | | | | None |
| 22.5 hrs | 0.344 | 0.044 | 4.75 | 0.0093 | 2–5 |
| 69 hrs | ([3]) | 0.192 | | | 78 |
| 88 hrs | ([3]) | 0.192 | | | 78 |

[1] Corrected for surface reflection.
[2] Shift begins.
[3] Strong shift.
[4] Spontaneous fracture.

Certain observations not included in the above tabulation follow:

The sample which had experienced 235 hours of steam exposure at 680° C. was checked for surface compression with the Abbe refractometer. The indexes were 1.5303 and 1.5286. The index difference, 0.0017, would produce a retardation of 17,000 mu/cm. or 43,200 mu/inch. Using a stress optic factor 1.75 the indicated surface stress is 75,500 p.s.i. Since the basic strength of this glass-ceramic is about 20,000 p.s.i., the predicted strength for a product vapor-crystallized by this technique is close to 100,000 p.s.i. Evidently this slow crystallization is advantageous for developing a high stress of the differential-expansion type.

Unusual penetration depth is produced by the low-temperature treatment. A dummy sample ¼″ thick that was treated along with the infrared sample showed a compression layer depth of 447 microns (17.6 mils) after 468 hours at 680° C. The interior was about 72% crystalline (index 1.526) at this point, and the surface compression (quartz-wedge) was about 6400 mu/inch. (11,200 p.s.i.).

In both the 680° and the 710° experiments, the shape of the absorption eventually changed in a fundamental way, becoming sharper and shifting to longer wavelengths. As soon as this shift begins, the optical density at the peak of the band loses its relationship to the optical densities calculated for the other band shape. The change in the band shape is evidently a consequence of the developing crystallization of the interior of the sample. The crystallization of the surface alone is relatively so shallow that it has no noticeable effect on the shape of the absorption. Other bands appear in the 4–5 micron region, as is revealed in a difference spectrum.

The ratio of optical density increment to the square root of time should be constant, assuming that Fick's law is obeyed in the diffusion of water into glass. This ratio tends to drop progressively as diffusion proceeds. This is probably due to the increasing crystallinity of the surface layers. The effect tends to set a practical limitation on the thickness of the compression layer that can be achieved.

The absolute water content of a glass can in principle be calculated from an infrared spectrum, but it is a complicated and uncertain procedure. Scholze gives directions in the paper referenced above. The contribution from each of the various water bands must be separately evaluated, and then summed to give the total water content. The relative significance of the bands and the coefficients to be used vary with the type of glass, and all is based on a calibration derived from a vacuum fusion analysis of the glass being studied. For glasses which contain little non-bridging oxygen, a simplification is permissible: all water is assumed to be represented by the 2.85 micron band, and a fictitious extinction coefficient of 70 liters/(mol cm.) is used; this roughly includes the contribution from the neglected bands of lesser significance.

A water analysis for glass made on this basis follows in Table VIII.

TABLE VIII

| Sample No. | Thickness, mm. | Percent $H_2O$ (wt.) |
|---|---|---|
| Treated 650° C., 7 hrs., 52–58 p.s.i. steam: | | |
| 1 | 2.15 | 0.038 |
| 2 | 1.59 | 0.037 |
| Untreated controls: | | |
| 3 | 1.62 | 0.029 |
| 4 | 2.13 | 0.030 |

These data show that the average water content is increased by steam treatment. Of greater interest is how much the water content of the surface layer is increased by steam treatment. An approximate calculation can be made.

Assuming that the penetration depth is 0.2 mm. on each surface of sample #1, the extra 0.008% on the average water content (comparing samples 1 and 4, which are almost equal in thickness) can be ascribed to two surface layers, each of which has an average water content 0.043% higher than the initial water content, 0.030%.

Based on this calculation the difference in crystallization behavior of surface and interior is brought about by approximately doubling the water content of the glass at the surface.

A still larger difference in crystallization behavior would undoubtedly be observed if one could begin with a drier glass. Another reason for wanting a drier base glass is the desirability of eliminating the 2.85 micron absorption band, which seriously reduces the radiative transfer of heat through the resulting glass ceramic.

Possible methods for drying glass as a pre-conditioning step to be used as part of the method of this invention include prolonged heating of a monolithic glass article in a dry atmosphere as in an electric furnace and drying during fining of the molten glass by bubbling dry gas, preferably an inert gas, through the molten glass prior to forming.

It is possible to include a suitable nucleating agent in or on the surface of the glass as taught by U.S. Pat. No. 3,464,880. The nucleation techniques vary somewhat depending upon whether a semi-crystalline article, that is, an article with crystals only in the surface portions of the article, or a fully crystallized article are desired. Generally, nucleation requires subjecting the crystallizable glass article to elevated temperatures for certain periods of time. The time and temperature of nucleation also depend upon the fineness of the crystals to be promoted. The creation of a large number of nucleation sites will generally provide finer crystals than crystallization from only a few nucleation sites. The instant invention is not confined to any particular method of nucleation.

The techniques of crystallization depend upon whether a semi-crystalline article or a fully crystallized article is to be formed. The distinctions between these techniques are described above.

The instant invention is broadly applicable to crystallizable glass compositions and processes generally. In the first phase of the invention, a crystallizable glass capable of bulk crystallization is treated in such a manner that substantially no moisture is lost from the surface portions of the glass during the crystallization of the glass. This may be accomplished by introducing sufficient water vapor into the atmosphere surrounding the glass article during crystallization to maintain substantially an equilibrium with the water contained in the glass article. Also, the crystallizable glass article may be treated previously with a material, e.g., refractory coatings, to form a vapor impermeable coating on the glass prior to crystallization.

Suitable vapor impermeable coatings for this purpose are the refractory oxide coatings of silicon, titanium, aluminum, chromium, tin, indium, iron, and the like. Also suitable are metal coatings such as titanium, chromium, platinum, and the like, which would not be adversely affected by the temperature experienced during nucleation and/or crystallization. Metal films and metal oxide films can be applied by techniques known in the art. Pyrolyzation techniques could be employed for the application of metal oxide coatings; however, application of such coatings by pyrolytic techniques could result in the loss of moisture from the surface areas of the glass. Therefore, it is preferred to use low-temperature coating techniques such as those described in U.S. Pat. 2,831,780 and U.S. Pat. 2,768,909, or to use the various vacuum coating techniques well known in the art and described in detail in Holland in his book, Vacuum Deposition of Thin Films, Chapman and Hall, Ltd. (1963).

Vapor impermeable coatings could be applied to the glass article prior to nucleation and/or crystallization, thereby forming a protective coating which could permit crystallization without substantial loss of moisture from the surface areas of the glass articles. This would prevent surface cracking and crazing frequently encountered in the crystallization of crystallizable glass articles.

Coating the glass with a material which also serves as a nucleating agent for the crystallizable glass material can also be advantageous in promoting crystallization near the surface as well as acting as a vapor barrier. Since one of the objectives of retaining or increasing moisture near the surface is to promote more rapid crystallization at the surface areas than occurs in the interior of the article, it can be seen that vapor impermeable surface coatings of a nucleating agent could have a two-fold effect. Thus, a coating such as $TiO_2$ or $ZrO_2$ could be particularly effective in the prevention of crazing or the promotion of strength in a crystallized glass-ceramic article.

Plates have been coated with $TiO_2$ without prior steam treatment to increase water content. Some beneficial effects are noted. Crazing is less severe indicating reduced water loss but no particular strengthening is observed. Plates were coated with tin oxide according to the teachings of U.S. Pat. No. 2,831,780 and No. 2,768,909 and without prior steam treatment to increase water content. Some beneficial effects are noted. Crazing is less severe indicating reduced water loss but no particular strengthening is observed. Plates were coated with tin oxide according to the teachings of U.S. Pats. No. 2,831,780 and No. 2,768,909 and without prior steam treatment. This appears to prevent otherwise expected crazing during crystallization.

Although specific embodiments have been set forth in the above examples, it is not intended that the invention is limited solely thereto, but should include all the variations and modifications falling within the scope of the appended claims.

I claim:

1. A method of producing a strengthened glass-ceramic article having randomly oriented crystals of substantially uniform composition disposed substantially throughout the glass-ceramic body, characterized by a surface zone in a state of compression and an interior zone in a state of tension, comprising the steps of:

(a) heating a crystallizable glass article comprising a glass composition which is capable of nucleation throughout and which has a different specific volume in its crystal phase than in its glassy phase, to a sufficient temperature at about its strain point for a sufficient time in the presence of an effective amount of water to establish a difference in the water content of the glass immediately subjacent the surface less the water content of the glass in the interior as the difference of the specific volume of the crystallizable glass composition as a glassy phase less the specific volume of the composition as a crystalline phase;

(b) nucleating the glass throughout by heating it at a sufficient temperature for a sufficient time to develop nuclei throughout; and (c) heating said article at a higher temperature for a sufficient time to develop randomly-oriented crystals throughout said article, whereby there develops said surface zone of compression and said interior zone of tension in said article at said higher temperature.

2. The method of claim 1 wherein the crystallizable glass composition is characterized as having a crystalline phase specific volume greater than its glass phase specific volume; wherein the effective amount of water present is substantial dryness; wherein said first heating is effective to decrease the water content of the glass immediately subjacent the surface of said article relative to the water content in the interior of said article; and wherein substantially full crystallization occurs within the interior earlier than immediately subjacent the surface during the step of further heating the article at said higher temperature to develop crystals throughout, whereby the surface is placed in compression and the interior in tension.

3. The method of claim 2 wherein the glass is subjected to steam treatment at a temperature below its strain point before step (a) whereby the water content throughout the glass is effectively increased.

4. The method of claim 1 wherein the crystallizable glass composition is characterized as having a crystalline phase specific volume less than its glassy phase specific volume and sufficient water is present during said heating to effectively increase the water content of the glass immediately subjacent the surface of said article relative to the water content in the interior; and wherein substantially full crystallization occurs immediately subjacent the surface earlier than within the interior during the step of further heating the article at said higher temperature to develop crystals throughout, whereby the surface is placed in compression and the interior in tension.

5. The method of claim 4 wherein the glass is dried before step (a).

6. The method of claim 4 wherein the step of heating to form crystals is carried out in the presence of an effective amount of water to prevent substantial loss of water from the glass during heating.

7. The method of claim 4 wherein during the step of heating to form crystals the article is surrounded by a substantially impermeable barrier such that substantial loss of water from the glass is prevented during heating.

8. The method of claim 1 wherein the crystallizable glass comprises about 45 to 72 percent by weight silica, about 15 to 35 percent by weight alumina, about 3 to 10 percent by weight lithia, about 1 to 2 percent by weight $ZrO_2$, about 1 to 2 percent by weight $TiO_2$ and the article is crystallized to more than about 90 percent by volume crystal content throughout.

9. The method of claim 1 wherein the step of heating to form crystals is carried on until the article is substantially fully crystalline throughout as indicated by substantial uniformity of coefficient of thermal expansion throughout.

10. A strengthened glass-ceramic article characterized as having randomly oriented crystals of substantially uniform composition disposed substantially throughout the glass-ceramic article and characterized as having a surface zone in a state of compression and an interior zone in a state of tension, which states can be maintained at elevated temperatures; said article produced according to the method of claim 1.

References Cited
UNITED STATES PATENTS

| | | | |
|---|---|---|---|
| 3,300,670 | 11/1967 | Veres | 65—33 |
| 3,428,513 | 2/1969 | Denman | 65—33 X |
| 3,464,807 | 9/1969 | Pressau | 65—33 |
| 3,464,880 | 9/1969 | Rinehart | 65—30 X |
| 3,498,802 | 3/1970 | Bickford et al. | 65—32 X |
| 3,498,803 | 3/1970 | Stookey | 65—32 X |

OTHER REFERENCES

Handbook of Glass Mfg., vol. II, Tooley, pp. 192–199.

E. E. Wagstaff, S. D. Brown et al. "The Influence of $H_2O$ & $O_2$ Atmosphere of the Crystallization of Vitreous Silica, Physics & Chem. of Glasses, vol. 5, No. 3, June 1964, pp. 76–81.

FRANK W. MIGA, Primary Examiner

U.S. Cl. X.R.

65—30, 32; 161—1

UNITED STATES PATENT OFFICE
CERTIFICATE OF CORRECTION

Patent No. 3,756,798     Dated September 4, 1973

Inventor(s)   Fred M. Ernsberger

It is certified that error appears in the above-identified patent and that said Letters Patent are hereby corrected as shown below:

Claim 4, column 20, line 70, "during said heating" should read --during said first heating--.

Signed and sealed this 15th day of January 1974.

(SEAL)
Attest:

EDWARD M. FLETCHER, JR.
Attesting Officer

RENE D. TEGTMEYER
Acting Commissioner of Patents